United States Patent [19]
Moy et al.

[11] Patent Number: 5,469,814
[45] Date of Patent: * Nov. 28, 1995

[54] SMALL ANIMAL RECOVERY COLLAR

[76] Inventors: Deirdre L. Moy; Kelly A. Moy, both of 125 Galewood Cir., San Francisco, Calif. 94131

[*] Notice: The portion of the term of this patent subsequent to May 3, 2011, has been disclaimed.

[21] Appl. No.: 273,370
[22] Filed: Jul. 8, 1994
[51] Int. Cl.$^6$ ................................................. A01K 15/04
[52] U.S. Cl. ........................................ 119/815; 119/855
[58] Field of Search ................................. 119/865, 856, 119/855, 815, 816, 821

[56] References Cited

U.S. PATENT DOCUMENTS

| 180,518 | 8/1876 | Armentrout . |
| 205,515 | 7/1878 | Von Culin . |
| 2,810,368 | 3/1955 | McCombe . |
| 2,989,030 | 6/1961 | Draheim . |
| 2,998,008 | 8/1961 | Klesa . |
| 3,013,530 | 12/1961 | Zeman . |
| 3,036,554 | 5/1962 | Johnson . |
| 3,072,098 | 1/1963 | Boemle . |
| 3,942,306 | 3/1976 | Kulka . |
| 4,328,605 | 5/1982 | Hutchinson et al. . |
| 4,476,814 | 10/1984 | Miller . |
| 4,489,676 | 12/1984 | Colquist . |
| 4,598,666 | 7/1986 | Spanko . |
| 4,719,876 | 1/1988 | Wilken .................................. 119/865 |
| 5,012,764 | 5/1991 | Fick et al. . |
| 5,307,764 | 5/1994 | Moy . |

FOREIGN PATENT DOCUMENTS 1191748  8/1985  Canada .

Primary Examiner—Todd E. Manahan
Attorney, Agent, or Firm—Skjerven, Morrill, MacPherson, Franklin & Friel; David E. Steuber

[57] ABSTRACT

A sheet of flexible material is fastened around the neck of a household pet or other animal to inhibit the animal from bending its neck and thereby biting or licking wounds or other sensitive areas on its body. When fitted to the animal, the sheet extends between the animal's mandible and the animal's scapula in the region of the shoulder joint.

7 Claims, 3 Drawing Sheets

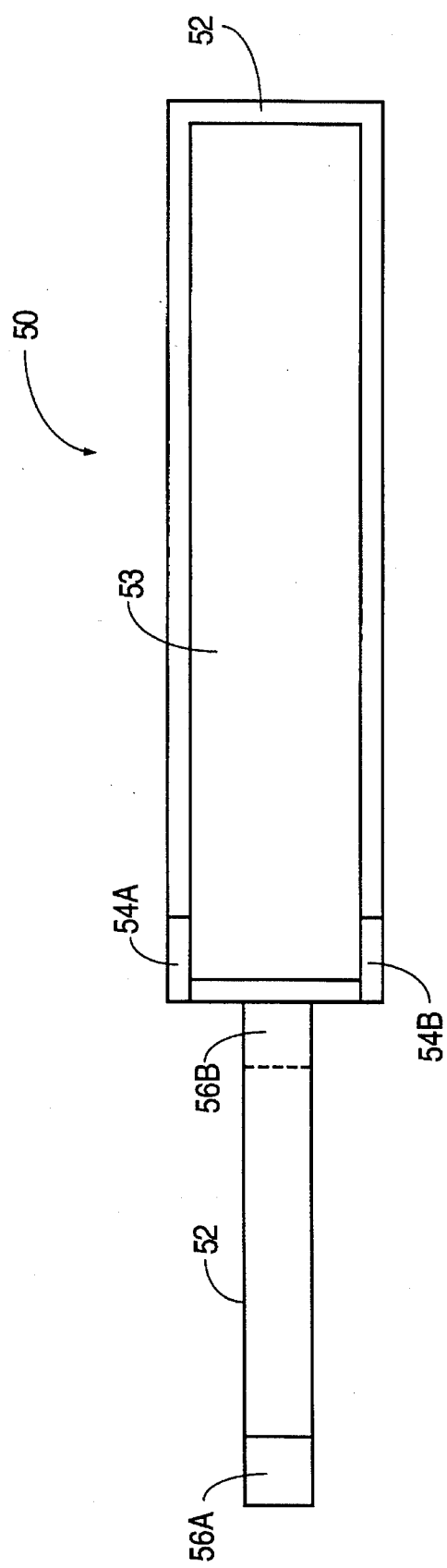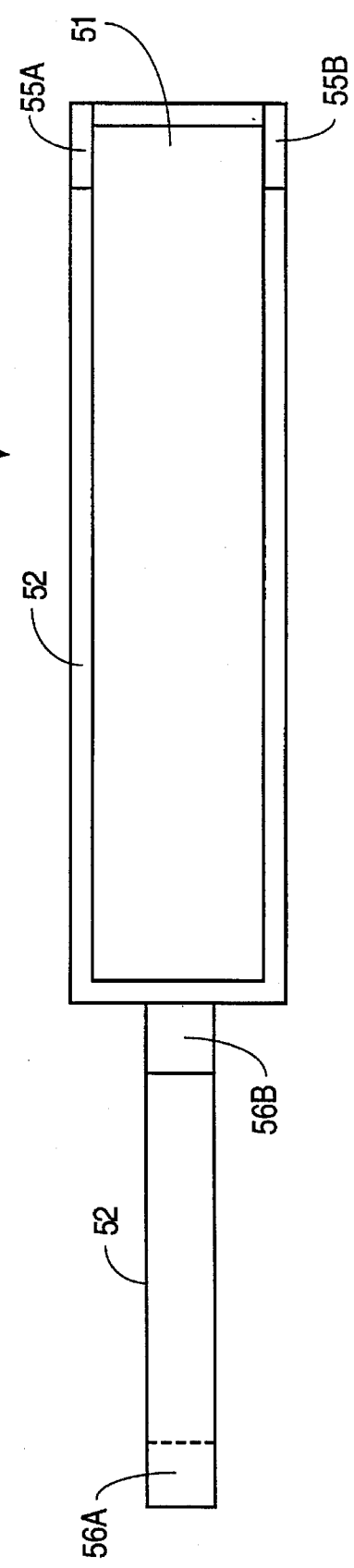
FIG. 5A
FIG. 5B

SMALL ANIMAL RECOVERY COLLAR

FIELD OF THE INVENTION

This invention relates to devices for preventing a wounded or convalescing animal from injuring itself and, in particular, to a protective collar which prevents the animal from biting or licking a surgical wound.

BACKGROUND OF THE INVENTION

It is a well known fact that household pets are apt to lick or nibble at wounds, sores, rashes, sutures, flea bites and other afflicted portions of their bodies. This propensity can not only retard the healing process but also lead to complications which require further medical attention. Therefore, unless the animal is immobilized with some sort of body truss, it must be prevented from reaching the wound or irritated area with its mouth.

At present, one of the most common devices for doing this is the so-called Elizabethan collar, which is described in U.S. Pat. No. 3,036,554 to F. L. Johnson. A disk in the form of a truncated cone is fitted around the animal's neck and prevents the animal from reaching its body with its mouth. Elizabethan collars, however, are rather cumbersome devices, and they interfere with the ability of the animal to sleep, eat and drink. They also obscure the animal's peripheral vision and interfere with its mobility, making it difficult to run, jump, climb stairs, and maneuver around corners and through narrow spaces. They act as a barrier between the animal and its owner, preventing the owner from holding the animal and preventing the animal from jumping up on the owner. Finally, Elizabethan collars are unsightly and can be a source of embarrassment to the owner. Other similar collars are described in U.S. Pat. No. 3,013,530 and U.S. Pat. No. 3,072,098.

SUMMARY OF THE INVENTION

All of these problems are overcome with the protective collar of this invention. A strip of hard but flexible material is formed into a cylindrical or tubular shape around the animal's neck. The width of the strip (i.e., the axial length of the tubular shape) is correlated with the length of the animal's neck, so that one edge of the collar presses against the animal's mandible (jaw bone) and atlas vertebra while the other edge of the collar presses against the animal's scapula (shoulder bone) in the region of the shoulder joint. As the animal attempts to bend its neck, the animal experiences some discomfort from the collar, the discomfort increasing as its head swings further toward its body. Ultimately, the collar prevents the animal from bending its neck further, well before it is able to make contact between its mouth and its body. The stiffness of the collar (i.e., its resistance to deformation as the animal attempts to bend its neck) is largely attributable to the fact that it is formed into a tubular shape. The curvature of the collar when worn by the animal increases the rigidity of its edges and thereby produces the discomfort which deters the animal from attempting to bend its neck.

In a preferred embodiment, the collar is constructed of a sheet of plastic and is held on the animal's neck with an elastic strap and a VELCRO fastener.

BRIEF DESCRIPTION OF THE DRAWINGS

FIGS. 5A and 5B illustrate views of the alternative pet collar from opposite sides, respectively.

DESCRIPTION OF THE INVENTION

Figure 1:
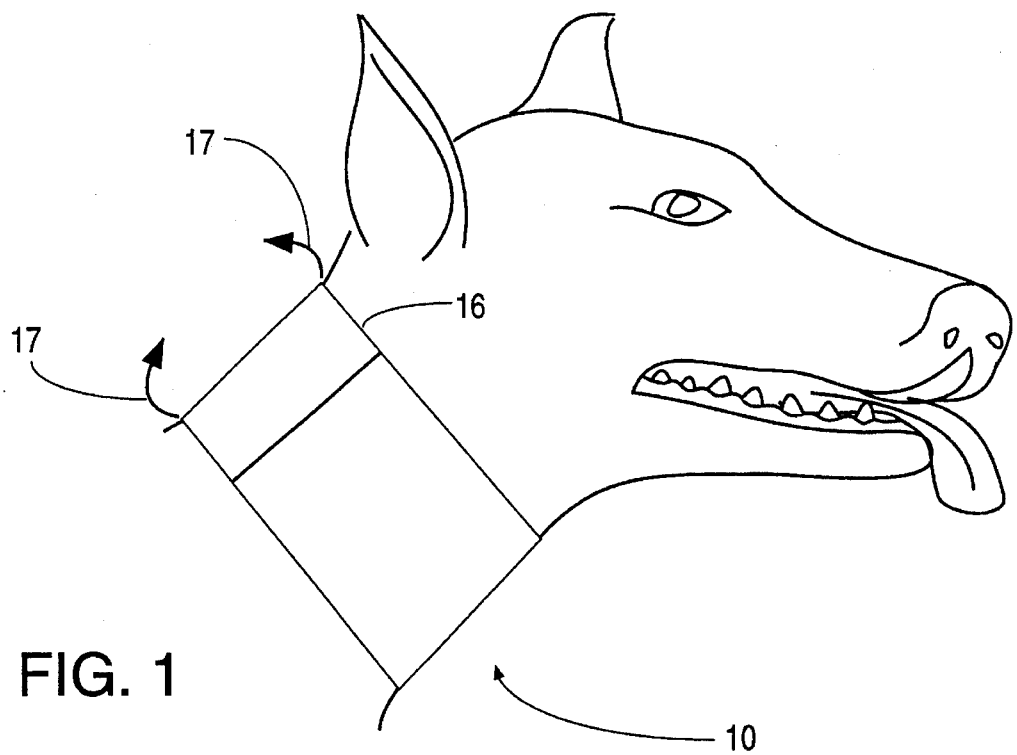
FIG. 1 illustrates the protective collar of this invention as worn by a dog.

FIG. 1 illustrates a protective collar 10 being worn by a dog. Collar 10 is bent into a tubular form snugly enclosing the dog's neck, and fastened.

Figure 2:
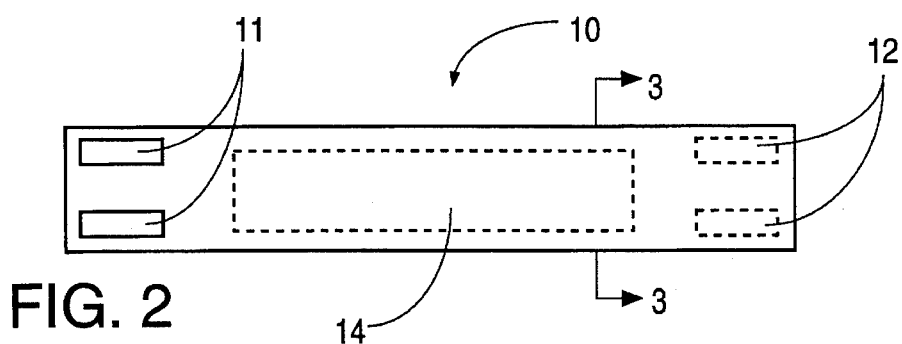
FIG. 2 illustrates a top plan view of the protective collar.

FIG. 2 illustrates a top plan view of protective collar 10 showing VELCRO fastener strips 11 at one end of the collar which mate with corresponding VELCRO strips 12 attached to the other side of the collar when collar 10 is wrapped around an animal's neck.

Figure 3:
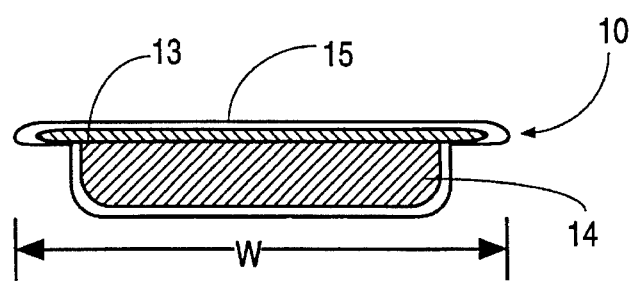
FIG. 3 illustrates a cross-sectional view of the protective collar taken at section 3—3 shown in FIG. 2.

FIG. 3 illustrates a cross-sectional view of collar 10 taken at section 3—3 shown in FIG. 2. A sheet 13 is made of a flexible material, which in the preferred embodiment is a sheet of low density polyethylene. Pressed against the underside of sheet 13 is a foam pad 14 which may make the collar somewhat more comfortable when it is being worn by the animal, and keeps it from slipping off the animal. Sheet 13 and foam pad 14 are enclosed by a fabric 15. It is to be understood that fabric 15 is optional and not at all essential to the invention.

The correct width W of collar 10 depends on the size of the animal's neck. For most dogs, W will be in the range of from 2½ inches to 5 inches. Preferably, the collar should extend substantially between the animal's scapula (shoulder blade) at the lower edge and its mandible (lower jaw) and atlas vertebra at the upper edge. Essentially the animal's entire neck should be enclosed. The length of collar 10 and the placement of VELCRO pads 11 and 12 should be such that collar 10 fits snugly on the animal's neck but does not create discomfort unless the animal attempts to turn its head. Obviously, the animal's breathing and circulation should not be restricted when the collar is in place.

Referring again to FIG. 1, as the dog attempts to bend its neck, an edge 16 of collar 10 presses on its skin, creating a certain amount of discomfort or minor pain and deterring the dog from bending its neck further. If the dog continues to bend its neck further, eventually collar 10 will prevent the dog from any further bending movement. The thickness of sheet 13 should be correlated with the width of collar 10, so that transverse bending (indicated by arrows 17 in FIG. 1) is substantially prevented by the curvature of the collar. For example, a collar 3 inches wide using a sheet of low density polyethylene approximately ⅛ inch thick was found suitable for a cairn terrier.

With the collar of this invention, the animal is free to eat, drink and sleep without undue inconvenience or discomfort. Moreover, it can walk, run and otherwise engage in most of its normal activities, the only restriction being on its ability to turn its head so as to approach its body with its mouth. Peripheral vision is unimpeded.

Figure 4:
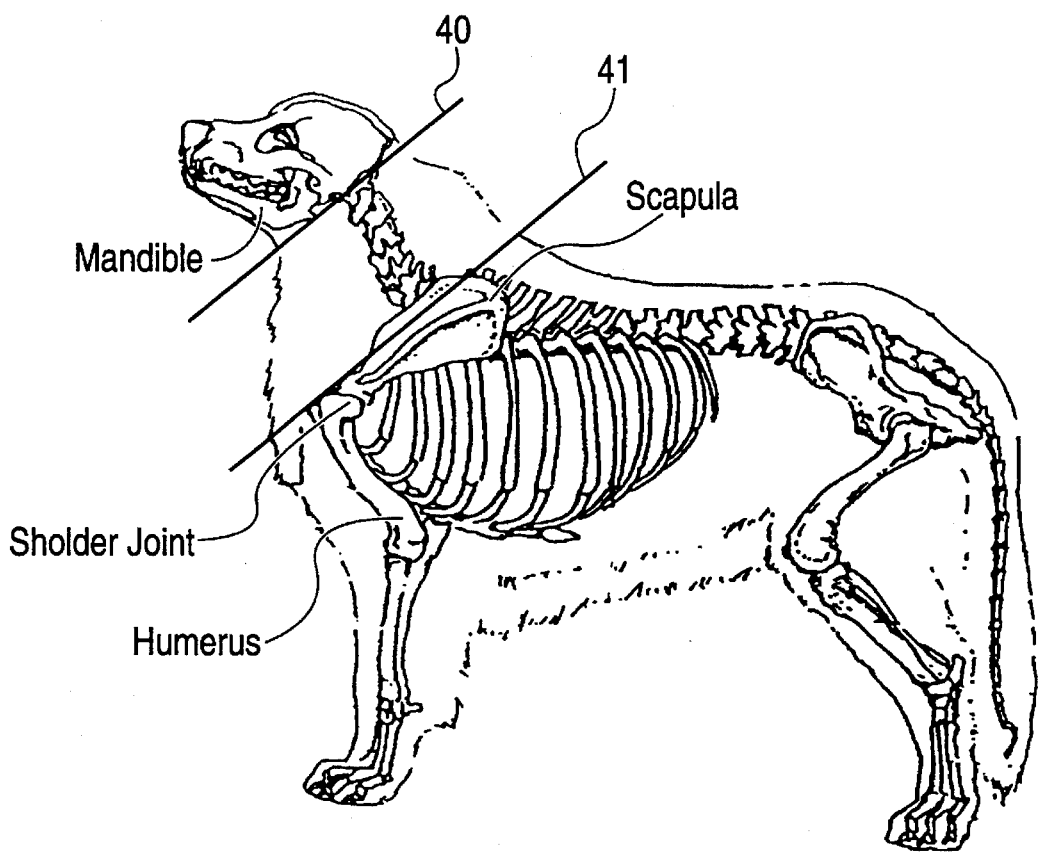
FIG. 4 illustrates a skeletal view of an animal which shows the locations of the edges of a pet collar according to an alternative embodiment of this invention.

The protective collar has been found to be particularly effective if the lower edge of the collar presses against the animal's scapula in the region of the shoulder joint (i.e., the joint between the scapula and the humerus). This is illustrated in the skeletal view of FIG. 4, wherein the line 40 illustrates the location of the upper edge of the collar and the line 41 illustrates the location of the lower edge of the collar. As indicated, the lower edge of the collar is located at the bottom of the scapula in the region of the shoulder joint. This type of collar is particularly effective in preventing the animal from licking or biting its front paws, chest, belly or genitals. The collar will generally be from 3½ inches to 8 inches wide for dogs, although particularly large breeds such as Great Danes may require a collar as much as 10 inches wide. The collar will generally be from 2½ to 3 inches wide for cats.

FIGS. 5A and 5B illustrate a preferred embodiment of this type of collar. FIG. 5A illustrates a collar 50 from the side which contacts the animal's neck and FIG. 5B illustrates collar 50 from the opposite side. Collar 50 contains essentially two parts: a plastic sheet 51 (FIG. 5B) and an elastic strap 52 which is attached to one end of plastic sheet 51. Plastic sheet 51 is preferably formed of low density polyethylene between approximately ⅛ inch to 3/16 inch in thickness depending on the size of the collar. Elastic strap 52 may be attached to the edge of plastic sheet 51 by stitching.

A cloth border or binding 52 is sewn to the four edges of plastic sheet 51. A foam sheet 53 is attached to the side of collar 50 which contacts the animal's neck by inserting the edges of foam lining 53 under the cloth border 52 and stitching it to plastic sheet 51. The purpose of foam lining 53 is to prevent collar 50 from slipping off the animal. Foam lining 53 may be a sheet of polyethylene foam ½ inch thick, and it may preferably be dimpled or convoluted to further prevent the animal from slipping out of the collar.

VELCRO strips 54A and 54B are attached to the inside of collar 50, and VELCRO strips 55A and 55B are attached to the outside of collar 50. When collar 50 is wrapped around the neck of an animal, VELCRO strip 54A attaches to VELCRO strip 55A, and VELCRO strip 54B attaches to VELCRO strip 55B.

Figure 6:
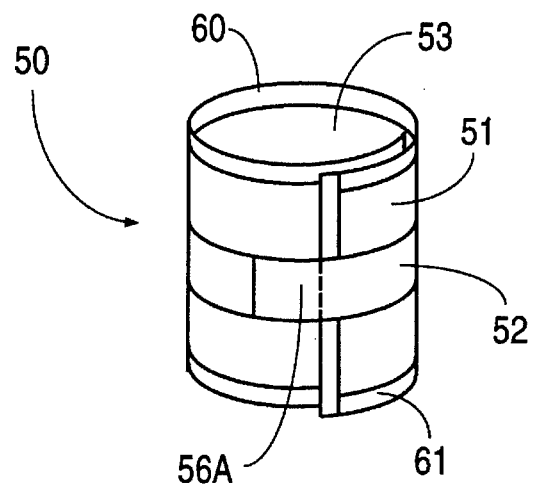
FIG. 6 illustrates the alternative pet collar in an operative configuration.

Elastic strap 52 provides additional support to keep collar 50 on the animal. A VELCRO pad 56A is attached to the end of strap 52 on the side facing the animal's neck. A second VELCRO pad 56B is attached to elastic strap 52 near the end which adjoins plastic sheet 51. When collar 50 is wrapped around the animal's neck, elastic strap 52 surrounds the outside of plastic sheet 51 and VELCRO pad 56A is attached to VELCRO pad 56B. FIG. 6 shows collar 50 in its operative configuration with VELCRO pads 56A and 56B in contact with each other. As shown, elastic strap 52 is wrapped around the outside of plastic sheet 51.

Referring again to FIG. 6, an upper edge 60 of collar 50 presses against the animal's mandible and atlas vertebra and a lower edge 61 of collar 50 presses against the animal's scapula in the region of the shoulder joint.

The collar of this invention is suitable for use with dogs, cats and other household pets, as well as any animal whose head needs to be restrained in order to prevent it from injuring itself. The VELCRO fasteners included in the embodiment may be replaced by buckles, tie strings, spring clips or any other type of fastener. The foregoing embodiments are therefore to be considered as illustrative only, the full scope of this invention being defined only in the following claims.

I claim:

1. A protective collar worn by a household pet or other animal, said collar comprising a sheet of hard, flexible material, said sheet being formed into a tubular shape around the neck of said animal, said collar having a width such that the collar extends between the animal's mandible and the animal's scapula in the region of the shoulder joint.

2. The protective collar of claim 1 further comprising a fastener.

3. The protective collar of claim 2 wherein the fastener includes at least one pair of VELCRO fastener strips.

4. The protective collar of claim 2 wherein the fastener includes an elastic band attached to an end of said sheet, said band being wrapped around said sheet.

5. The protective collar of claim 1 further comprising a foam lining attached to a side of said sheet.

6. The protective collar of claim 1 wherein said sheet is between 2½ inches and 10 inches wide.

7. A method of preventing a household pet or other animal from bending its neck so as to lick or bite an affected part of its body, said method comprising:

providing a sheet of hard, flexible material;

bending said sheet into a tubular shape so as to enclose said animal's neck; and fastening said sheet around said animal's neck, said sheet extending substantially between said animal's mandible and said animal's scapula in the region of the shoulder joint.

* * * * *